US011256993B2

(12) United States Patent
Ramamurthi et al.

(10) Patent No.: US 11,256,993 B2
(45) Date of Patent: *Feb. 22, 2022

(54) PARALLELIZATION APPROACHES OF MODIFIED TEACHING LEARNING BASED SEARCH OPTIMIZATION TECHNIQUE FOR VARIABLE SELECTION

(71) Applicant: Tata Consultancy Service Limited, Mumbai (IN)

(72) Inventors: Narayanan Ramamurthi, Hyderabad (IN); Geervani Koneti, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 1349 days.

This patent is subject to a terminal disclaimer.

(21) Appl. No.: 15/469,045

(22) Filed: Mar. 24, 2017

(65) Prior Publication Data
US 2018/0144652 A1    May 24, 2018

(30) Foreign Application Priority Data
Nov. 19, 2016   (IN) .............................. 201621039514

(51) Int. Cl.
*G06N 3/12* (2006.01)
*G06N 5/02* (2006.01)
(52) U.S. Cl.
CPC .................... *G06N 5/022* (2013.01)
(58) Field of Classification Search
CPC .... G06N 3/12; G06N 3/126; G06N 5/00–003; G06N 5/02–027; G06N 20/00–20
USPC ......................... 706/12–13, 45–48
See application file for complete search history.

(56) References Cited

U.S. PATENT DOCUMENTS

| 10,650,326 | B1* | 5/2020 | Johnston | G06F 16/906 |
| 2016/0055426 | A1* | 2/2016 | Aminzadeh | G06N 20/00 706/12 |
| 2017/0244633 | A1* | 8/2017 | Krishnan | H04L 45/306 |

OTHER PUBLICATIONS

Umbarkar et al "Parallelization of Teaching-Learning-Based Optimization over Multi-Core System", 2013, Proceedings of the International Conference on Advanced Engineering Optimization Through Intelligent Techniques.*

(Continued)

*Primary Examiner* — Jue Louie
(74) *Attorney, Agent, or Firm* — Finnegan, Henderson, Farabow, Garrett & Dunner, LLP

(57) ABSTRACT

Systems and methods include initializing a trainees population (TP), calculating an objective function (OF) of the TP to identify a trainer. A teaching pool is created using variables of each trainee and the identified trainer, and unique variables are added to obtain an updated teaching pool (UTP), a search is performed in parallel on UTPs to obtain 'm' subset of variables and OFs. OFs of 'm' subset are compared with OFs of the trainee's and variables of a first trainee in each thread are updated accordingly. In parallel, an updated learning pool (ULP) is created for selected trainee and the trainees, by adding unique variables to obtain 'n' subset which are compared with objective functions of selected trainee and the trainees and variables of a second trainee are updated accordingly. These steps are iteratively performed to obtain an optimal subset of variables that is selected for teaching and learning phase.

20 Claims, 9 Drawing Sheets

(56) References Cited

OTHER PUBLICATIONS

Satapathy et al. "Unsupervised feature selection using rough set and teaching learning-based optimization", 2013, Int. J. Artificial Intelligence and Soft Computing, vol. 3, No. 3.*

Cruz et al. "On applying a parallel Teaching-Learning-Based optimization procedure for automatic heliostat aiming." Jul. 2016, Proceedings of the 16th International Conference on Computational and Mathematical Methods in Science and Engineering.*

Niknam, T. et al., "A New Modified Teaching-Learning Algorithm for Reserve Constrained Dynamic Economic Dispatch", IEEE Transactions on Power Systems, IEEE, vol. 28, Issue 2, pp. 749-763, May 2013.

Umbarkar, A.J. et al., "OpenMP Teaching-Learning Based Optimization Algorithm over Multi-Core System", I.J. Intelligent Systems and Application, MECS, pp. 57-65, Jun. 2015.

* cited by examiner

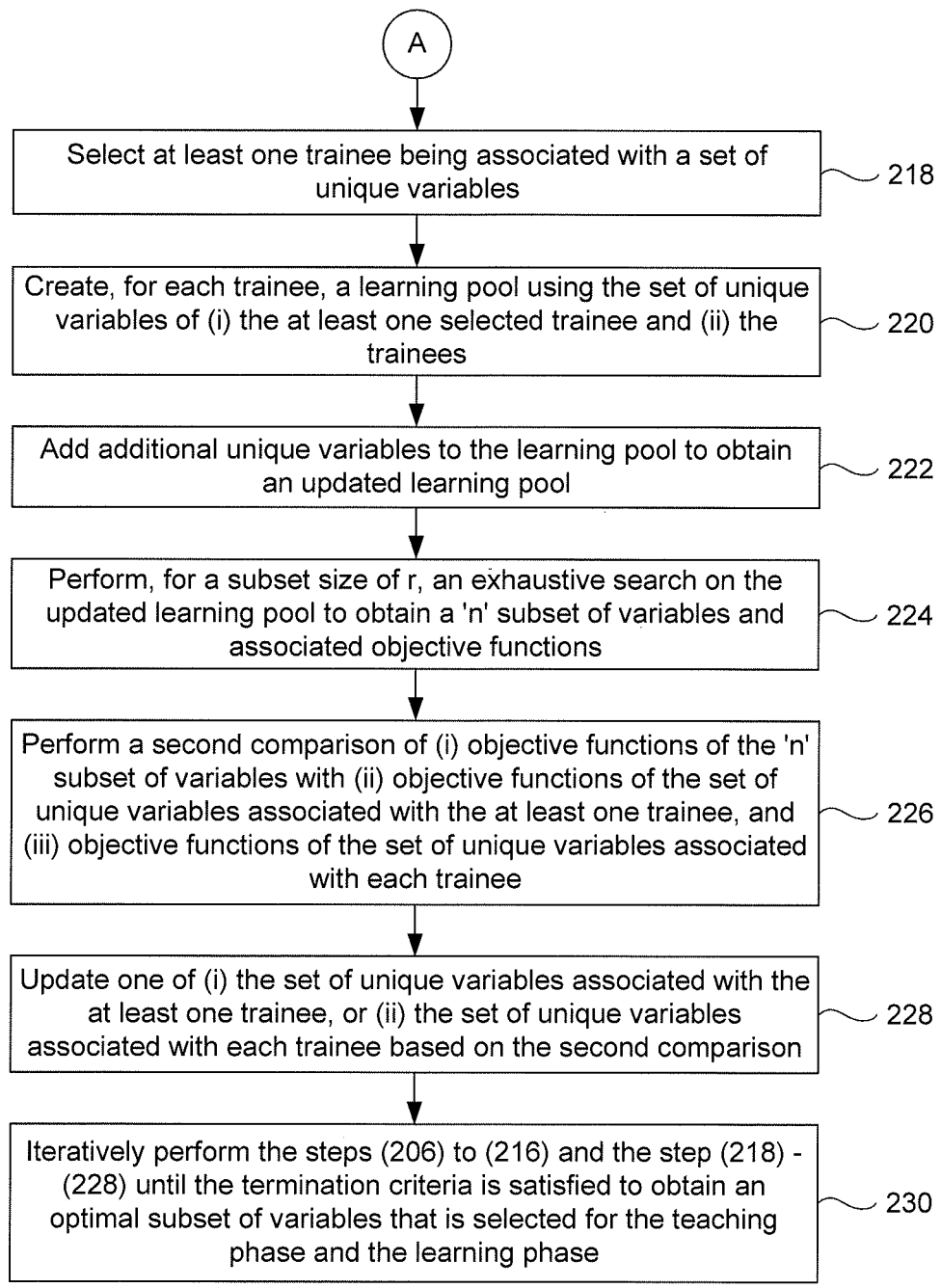
FIG. 2 (Contd)

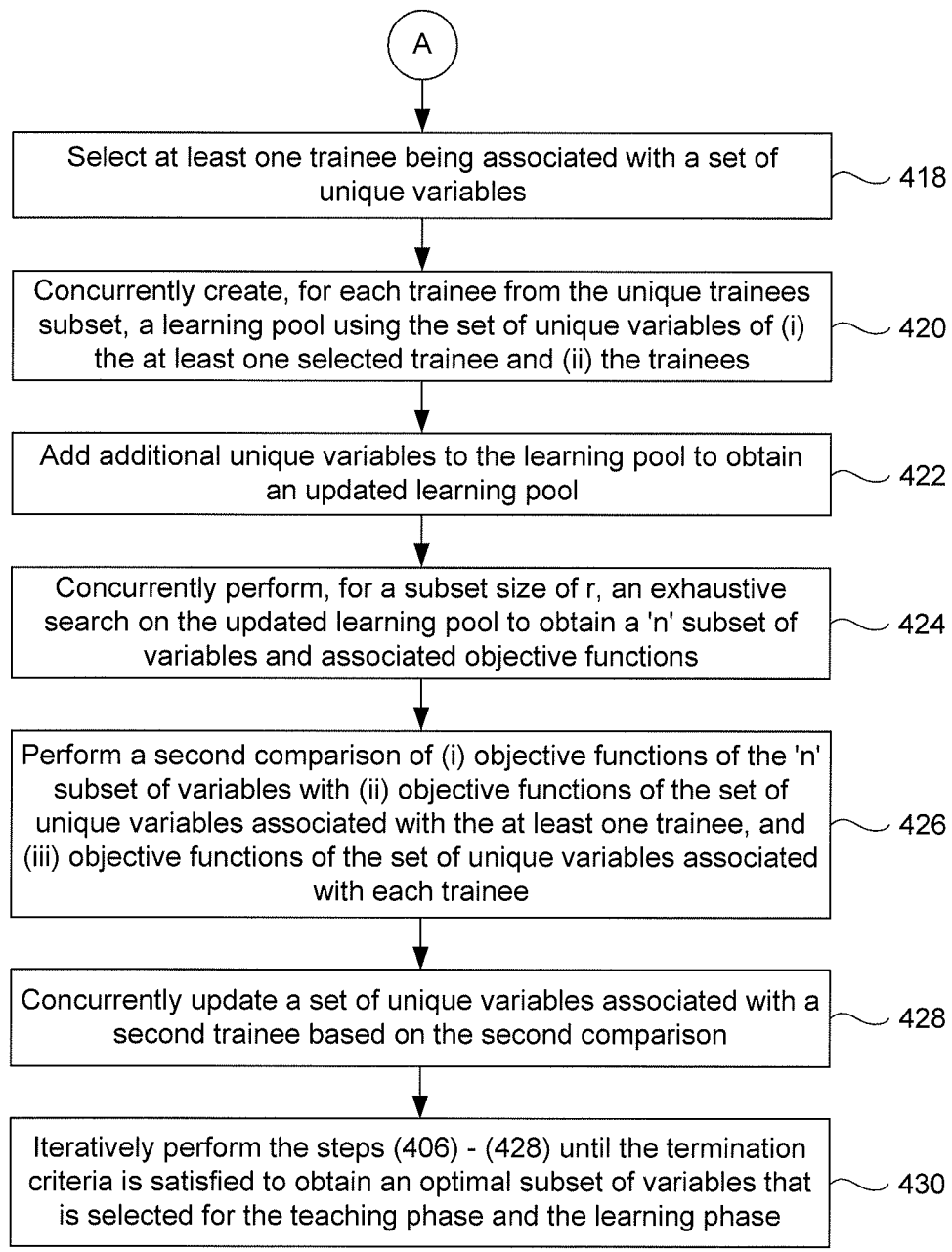
FIG. 4 (Contd)

PARALLELIZATION APPROACHES OF MODIFIED TEACHING LEARNING BASED SEARCH OPTIMIZATION TECHNIQUE FOR VARIABLE SELECTION

PRIORITY CLAIM

This U.S. patent application claims priority under 35 U.S.C. § 119 to: India Application No. 201621039514, filed on Nov. 19, 2016. The entire contents of the aforementioned application are incorporated herein by reference.

TECHNICAL FIELD

The disclosure herein generally relates to teaching learning based search optimization techniques, and, more particularly, to parallelization approaches of modified teaching learning based search optimization technique for variable selection and generating predictive models based on the selected variables.

BACKGROUND

Advancements in various sciences such as physical, life, social sciences etc., have generated large amounts of data and there is great interest to make use of these data for the creation of additional knowledge, as it is expected to improve the quality of human life. The quest for the additional knowledge and its associated positive impact on humanity, have created an urgent need for the development of efficient data analytics techniques and technologies such as high performance computing, cloud computing etc., which can handle large amounts of data. Variable selection methods are one such type of data analytics approach that is applied to the selection of a sub set of variables (X) from a large pool of variables based on various statistics measures. The selected variables can be used for the development of prediction models for a dependent variable (Y), when used with modelling techniques such as multiple linear regression, nonlinear regression etc. or for the generation of new rules/alerts. The variables selection can be accomplished using a random or exhaustive search technique. The exhaustive search approach, which evaluates each possible combination, is a computationally hard problem and hence, can be used only for smaller subsets. In such scenarios the most alternate approach is the use of heuristic methods such as ant colony, particle swarm optimization, genetic algorithm, and the like. However, these methods cannot guarantee an optimal solution as they fail to explore the complete problem (variable) space.

One such heuristic method is nature inspired optimization technique known as Teaching Learning Based Optimization (TLBO) proposed by Rao et al. The fundamentals of TLBO are based on the knowledge acquisition pattern of a classroom that can be broadly divided in to two phases: teaching and learning. In teaching phase, the students/trainees enhance their knowledge from the teacher/trainer. And, in the learning phase, the students interact among themselves to further augment their knowledge acquired from the teacher. The teacher and students are evaluated or represented with the marks they obtain in individual subject, in which the subjects may be the parameters of an optimization problem or variables of a feature selection problem. After each session, a teaching and a learning phase together, the teacher is updated with the best knowledge available in the classroom and the next session is executed. Consequently, the knowledge of the teacher and the students gets maximized through a number of sessions to obtain an optimal solution. FIG. 1 illustrates the workflow of the above technique for an optimization problem. Firstly, the population, considering the students, of the classroom is initialized and a stopping criterion and objective function to maximize or minimize is defined. Then, the objective function of the population is calculated to determine the best student, who will act as the teacher for the following session. Following which, each student $X_i$, in the teaching phase, improvises his or her solution based on the following expression:

$$X_{new} = X_{iold} + r(X_{teacher} - (T_f) \text{Mean}) \qquad \text{Equation (1)}$$

Further, it is determined, whether the new solution is better than the old solution, and accordingly the student/student's solution is updated. Likewise, in the learning phase, a student, $X_j$, is randomly selected from the population, and evaluated whether $X_j$ is better than $X_i$. If $X_i$ is better than $X_j$, than the following equation is computed:

$$X_{new} = X_{iold} + r(X_i - X_j) \qquad \text{Equation (2)}$$

Else if $X_j$ is better than $X_i$, the following equation is computed:

$$X_{new} = X_{iold} + (X_j - X_i) \qquad \text{Equation (3)}$$

In case the new solution is better than the old solution, the student is updated accordingly. If the termination criteria is not achieved, the step of modifying the students is repeated. The teaching factor, $T_f$, is taken as either 1 or 2 and r is a random number between 0 and 1. The termination criteria can be a fixed number of iterations, a threshold of objective function needed, a minimum allowed error, etc.

Subsequently, the TLBO is also applied to feature/variable/descriptor selection by Rajeev et al. titled "A novel methodology for feature subset selection using TLBO algorithm", wherein more than one teacher were introduced for each session and by Suresh et al. titled "Rough set and TLBO technique for optimal feature selection", wherein the same were employed along with rough set approach. Further, various works have also proposed several modifications of the basic technique such as replacing for example a worst student with other elite solutions, eliminating duplicates randomly, and introducing learning through tutorial or self-motivation. It is worth mentioning that majority of the applications of the TLBO method is focused on optimization solutions in engineering domain and its applications are not well established in the case of other domains such as life sciences, education etc.

SUMMARY

Embodiments of the present disclosure present technological improvements as solutions to one or more of the above-mentioned technical problems recognized by the inventors in conventional systems. For example, in one aspect, a processor implemented method is provided. The processor implemented method, comprising: defining, by one or more processors (i) a population size pertaining to a trainees population comprising a plurality of unique trainees subset, wherein each trainee from the plurality of unique trainees subset are associated with a set of unique variables, (ii) number of iterations, (iii) a subset size, correlation co-efficient V, and termination criteria comprising (iv) maximum allowed interrelation coefficient of independent variables $R_{int}$, (v) an objective function to be satisfied by each trainee $r_{min}^2$, and (vi) number of additional unique variables introduced in a teaching phase and a learning phase $Num_{rand}$; initializing, in parallel, by the one or more processors, each trainee from the trainees population with a value defined for an objective function above a threshold value; calculating an objective function of the trainees population and identifying an optimal trainer from the trainees population based on the calculated objective function; in the teaching phase, executing in parallel, each unique trainees subset from the plurality of unique trainees subsets in a corresponding execution thread by: creating, for each trainee from a unique trainees subset, a teaching pool using the set of unique variables of (i) the optimal trainer and (ii) one or more trainees from the unique trainees subset; adding additional unique variables to the teaching pool to obtain an updated teaching pool; performing, for a subset size of r, an exhaustive search on the updated teaching pool to obtain a 'm' subset of variables and associated objective functions; performing a first comparison of (i) the objective functions of the 'm' subset of variables with (ii) one or more objective functions of the set of unique variables associated with each trainee; and updating, based on the first comparison, a set of unique variables associated with a first trainee from the unique trainees subset; in the learning phase, concurrently executing, each unique trainees subset from the plurality of unique trainees subsets in the corresponding execution thread by: selecting a trainee being associated with a set of unique variables; creating, for each trainee from a unique trainees subset, a learning pool using the set of unique variables of (i) the at least one selected trainee and (ii) the one or more trainees; adding additional variables to the learning pool to obtain an updated learning pool; performing, for a subset size of r, an exhaustive search on the updated learning pool upon the additional variable being added to obtain a 'n' subset of variables and associated objection functions; performing a second comparison of (i) the objective functions of the 'n' subset of variables with (ii) one or more objective functions of the set of unique variables associated with the at least one selected trainee, and (iii) one or more objective functions of the set of unique variables associated with each trainee; and updating, based on a second comparison, a set of unique variables associated with a second trainee from the unique trainees subset; and iteratively performing the steps (c) to (n) until the termination criteria is satisfied to obtain an optimal subset of variables that are selected for the teaching phase and the learning phase.

In an embodiment, the processor implemented method may further comprise generating one or more predictive models based on the optimal subset of variables.

In an embodiment, wherein the teaching pool is created in the teaching phase by combining the set of unique variables of the optimal trainer with that of the one or more trainees from the unique trainees subset, and wherein the learning pool is created in the learning phase by combining the set of unique variables of the at least one selected trainee with that of the one or more trainees from the unique trainees subset.

In an embodiment, wherein when the objective functions of 'm' subset of variables is minimum or maximum than the one or more objective functions of the set of unique variables associated with the first trainee, the set of unique variables associated with the first trainee is updated.

In an embodiment, wherein when the objective functions of 'n' subset of variables is minimum or maximum than the one or more objective functions of the set of unique variables associated with the second trainee, the set of unique variables associated with the second trainee is updated.

In an embodiment, the first trainee and the second trainee are identical. In another embodiment, the first trainee and the second trainee are different from each other.

In an embodiment, the teaching phase and the learning phase are executed in series. In another embodiment, the teaching phase and the learning phase are concurrently executed.

In another aspect, a system for executing the processor implemented method is provided. The system comprising: a memory storing instructions; one or more communication interfaces; and one or more hardware processors coupled to the memory via the one or more communication interfaces, wherein the one or more hardware processors are configured by the instructions to: define (i) a population size pertaining to a trainees population comprising a plurality of unique trainees subset, wherein each trainee from the plurality of unique trainees subset are associated with a set of unique variables, (ii) number of iterations, (iii) a subset size, correlation co-efficient V, and termination criteria comprising (iv) maximum allowed interrelation coefficient of independent variables $R_{int}$, (v) an objective function to be satisfied by each trainee $r_{min}^2$, and (vi) number of additional unique variables introduced in a teaching phase and a learning phase $Num_{rand}$; initialize, in parallel, each trainee from the trainees population with a value defined for an objective function above a threshold value; calculate an objective function of the trainees population and identifying an optimal trainer from the trainees population based on the calculated objective function; in the teaching phase, concurrently execute, each unique trainees subset from the plurality of unique trainees subsets in a corresponding execution thread by: creating, for each trainee from a unique trainees subset, a teaching pool using the set of unique variables of (i) the optimal trainer and (ii) one or more trainees from the unique trainees subset; adding additional unique variables to the teaching pool to obtain an updated teaching pool; performing, for a subset size of r, an exhaustive search on the updated teaching pool to obtain a 'm' subset of variables and associated objective functions; performing a first comparison of (i) the objective functions of the 'm' subset of variables with (ii) one or more objective functions of the set of unique variables associated with each trainee; and updating, based on the first comparison, a set of unique variables associated with a first trainee from the unique trainees subset; in the learning phase, concurrently execute, each unique trainees subset from the plurality of unique trainees subsets in the corresponding execution thread by: selecting a trainee being associated with a set of unique variables; creating, for each trainee from a unique trainees subset, a learning pool using the set of unique variables of (i) the at least one selected trainee and (ii) the one or more trainees; adding additional variables to the learning pool to obtain an updated learning pool; performing, for a subset size of r, an exhaustive search on the updated learning pool upon the additional variable being added to obtain a 'n' subset of variables and associated objection functions; performing a second comparison of (i) the objective functions of the 'n' subset of variables with (ii) one or more objective functions of the set of unique variables associated with the at least one selected trainee, and (iii) one or more objective functions of the set of unique variables associated with each trainee; and updating, based on a second comparison, a set of unique variables associated with a second trainee from the unique trainees subset; and iteratively perform the steps (c) to (n) until the termination criteria is satisfied to obtain an optimal subset of variables that are selected for the teaching phase and the learning phase.

In an embodiment, the one or more hardware processors are further configured by the instructions to generate one or more predictive models based on the selected optimal subset of variables.

In an embodiment, the teaching pool is created in the teaching phase by combining the set of unique variables of the optimal trainer with that of the one or more trainees from the unique trainees subset, and wherein the learning pool is created in the learning phase by combining the set of unique variables of the at least one selected trainee with that of the one or more trainees from the unique trainees subset.

In an embodiment, when the objective functions of 'm' subset of variables is minimum or maximum than the one or more objective functions of the set of unique variables associated with the first trainee, the set of unique variables associated with the first trainee is updated.

In an embodiment, when the objective functions of 'n' subset of variables is minimum or maximum than the one or more objective functions of the set of unique variables associated with the second trainee, the set of unique variables associated with the second trainee is updated.

In an embodiment, the first trainee and the second trainee are identical. In another embodiment, the first trainee and the second trainee are different from each other.

In an embodiment, the teaching phase and the learning phase are executed in series. In another embodiment, the teaching phase and the learning phase are concurrently executed.

In yet another aspect, one or more non-transitory machine readable information storage mediums comprising one or more instructions is provided. The one or more instructions which when executed by one or more hardware processors causes defining, (i) a population size pertaining to a trainees population comprising a plurality of unique trainees subset, wherein each trainee from the plurality of unique trainees subset are associated with a set of unique variables, (ii) number of iterations, (iii) a subset size, correlation co-efficient V, and termination criteria comprising (iv) maximum allowed interrelation coefficient of independent variables $R_{int}$, (v) an objective function to be satisfied by each trainee $r_{min}^2$, and (vi) number of additional unique variables introduced in a teaching phase and a learning phase $Num_{rand}$; initializing, in parallel, by the one or more processors, each trainee from the trainees population with a value defined for an objective function above a threshold value; calculating an objective function of the trainees population and identifying an optimal trainer from the trainees population based on the calculated objective function; in the teaching phase, executing in parallel, each unique trainees subset from the plurality of unique trainees subsets in a corresponding execution thread by: creating, for each trainee from a unique trainees subset, a teaching pool using the set of unique variables of (i) the optimal trainer and (ii) one or more trainees from the unique trainees subset; adding additional unique variables to the teaching pool to obtain an updated teaching pool; performing, for a subset size of r, an exhaustive search on the updated teaching pool to obtain a 'm' subset of variables and associated objective functions; performing a first comparison of (i) the objective functions of the 'm' subset of variables with (ii) one or more objective functions of the set of unique variables associated with each trainee; and updating, based on the first comparison, a set of unique variables associated with a first trainee from the unique trainees subset; in the learning phase, concurrently executing, each unique trainees subset from the plurality of unique trainees subsets in the corresponding execution thread by: selecting a trainee being associated with a set of unique variables; creating, for each trainee from a unique trainees subset, a learning pool using the set of unique variables of (i) the at least one selected trainee and (ii) the one or more trainees; adding additional variables to the learning pool to obtain an updated learning pool; performing, for a subset size of r, an exhaustive search on the updated learning pool upon the additional variable being added to obtain a 'n' subset of variables and associated objection functions; performing a second comparison of (i) the objective functions of the 'n' subset of variables with (ii) one or more objective functions of the set of unique variables associated with the at least one selected trainee, and (iii) one or more objective functions of the set of unique variables associated with each trainee; and updating, based on a second comparison, a set of unique variables associated with a second trainee from the unique trainees subset; and iteratively performing the steps (c) to (n) until the termination criteria is satisfied to obtain an optimal subset of variables that are selected for the teaching phase and the learning phase.

In an embodiment, the processor implemented method may further comprise generating one or more predictive models based on the optimal subset of variables.

In an embodiment, wherein the teaching pool is created in the teaching phase by combining the set of unique variables of the optimal trainer with that of the one or more trainees from the unique trainees subset, and wherein the learning pool is created in the learning phase by combining the set of unique variables of the at least one selected trainee with that of the one or more trainees from the unique trainees subset.

In an embodiment, wherein when the objective functions of 'm' subset of variables is minimum or maximum than the one or more objective functions of the set of unique variables associated with the first trainee, the set of unique variables associated with the first trainee is updated.

In an embodiment, wherein when the objective functions of 'n' subset of variables is minimum or maximum than the one or more objective functions of the set of unique variables associated with the second trainee, the set of unique variables associated with the second trainee is updated.

In an embodiment, the first trainee and the second trainee are identical. In another embodiment, the first trainee and the second trainee are different from each other.

In an embodiment, the teaching phase and the learning phase are executed in series. In another embodiment, the teaching phase and the learning phase are concurrently executed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
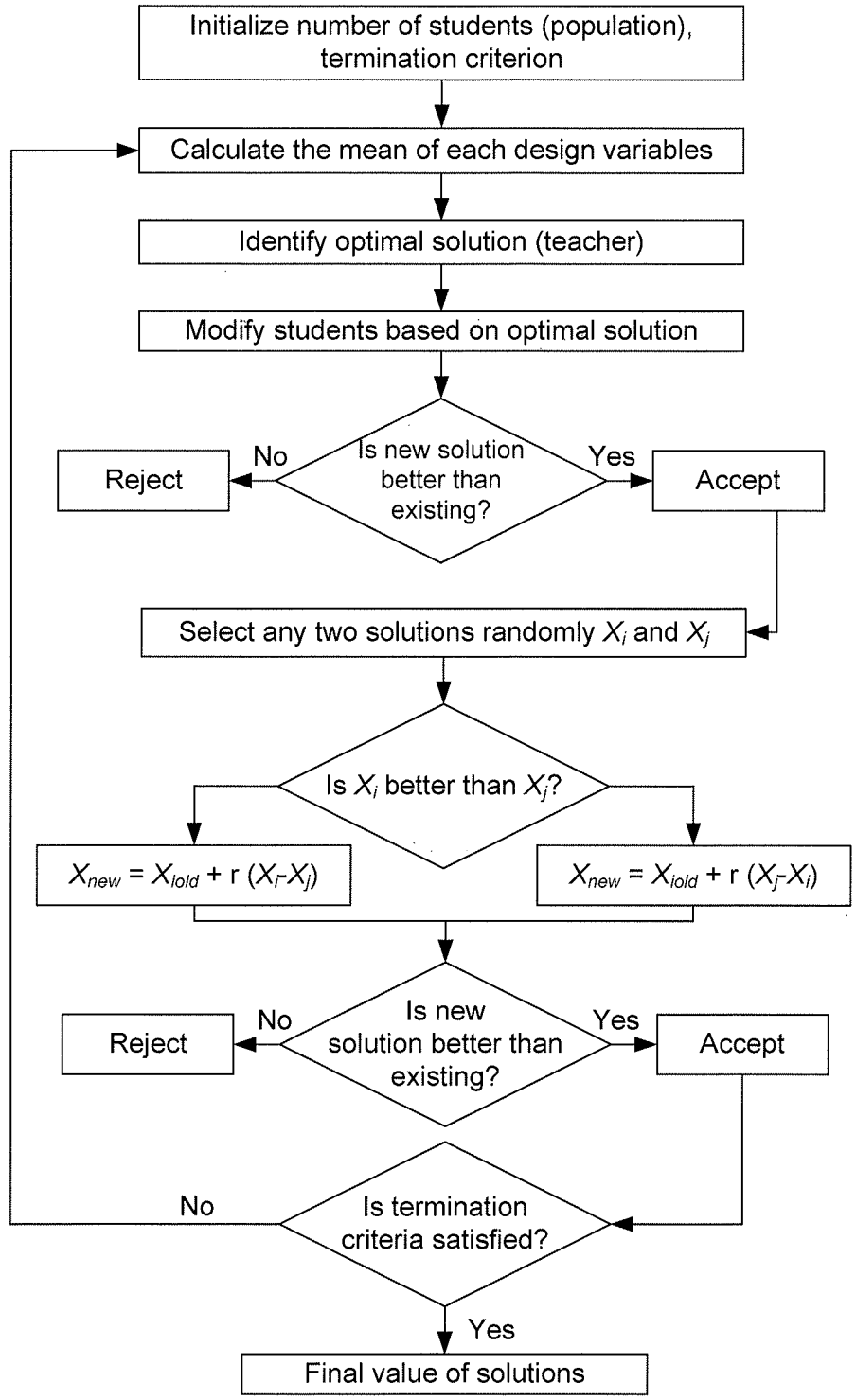
FIG. 1 illustrates the basic Teaching Learning Based Optimization (TLBO) technique.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments of the present disclosure provides systems and methods for parallelization of modified teaching learning based search optimization for variable selection and generating predictive models thereof. The prior works on modified teaching based learning search optimization have been successful in reproducing the results and also in completing the search function faster than the exhaustive search. But, the increased reliability in the results is at the cost of additional computation the algorithm does, increasing the time taken when compared to its basic version. Example, for subset size 7 and input data dimensionality of 275 the technique takes 56 seconds to complete. In scenarios where the a subset of size 10 or more is to be chosen from a pool of hundreds of descriptors, even the MTLBSO takes a bit more time, in hours. In order to address this downside, the embodiments of the present disclosure present parallelization of MTLBSO on various computational resources. Table 1 describes the time taken by serialized MTLBSO method that is written in C programming language.

| Subset Size | Serial MTLBO Time (sec) |
| --- | --- |
| 7 | 56 |
| 8 | 420 |
| 9 | 1820 |

Referring now to the drawings, and more particularly to FIG. 2 through 7B, where similar reference characters denote corresponding features consistently throughout the figures, there are shown preferred embodiments and these embodiments are described in the context of the following exemplary system and/or method.

Figure 2:
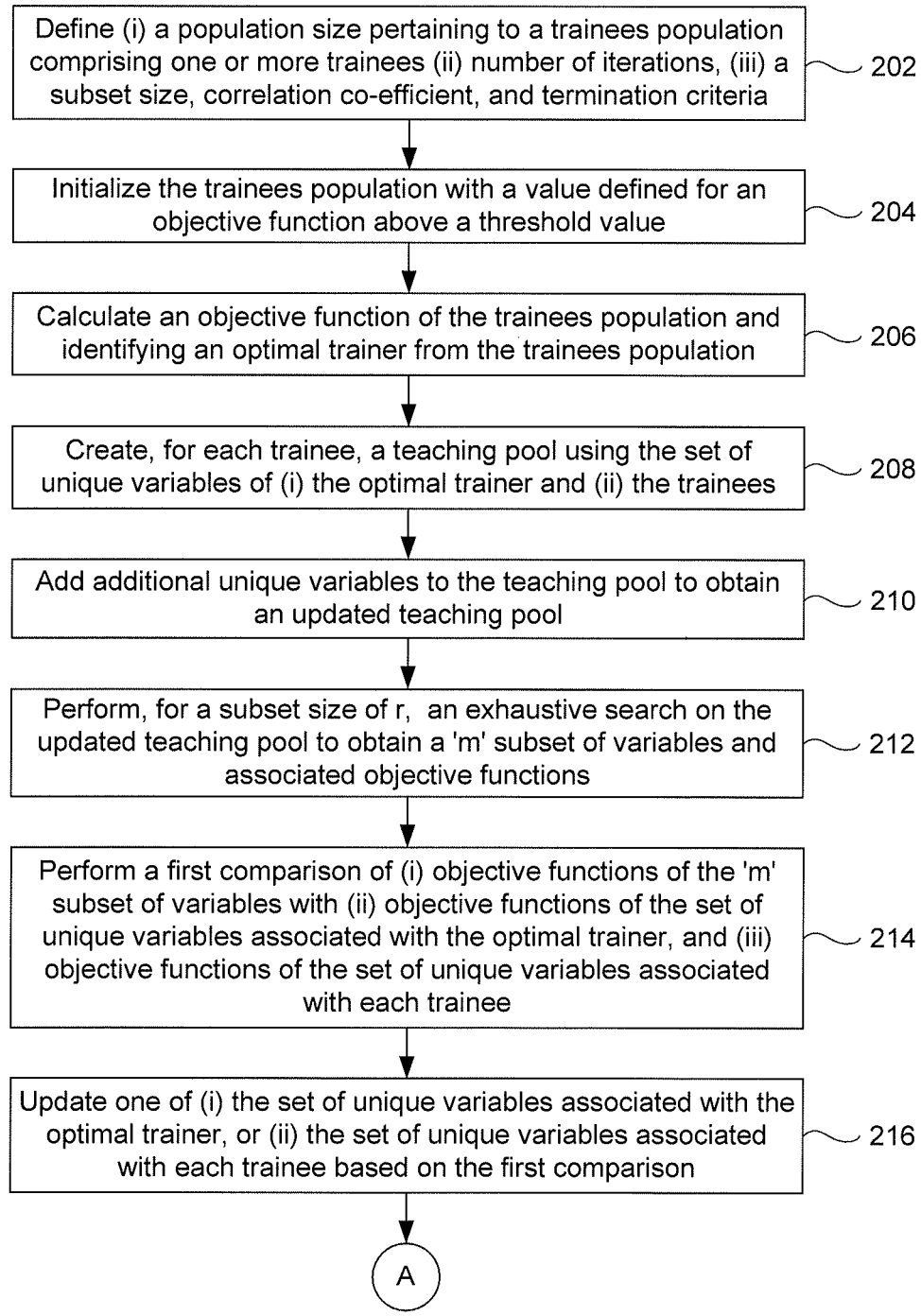
FIG. 2 illustrates an exemplary flow diagram of a processor implemented method for selecting optimal variables using a modified teaching learning based search optimization (MTLBSO) technique according to an embodiment of the present disclosure.
Figure 4:
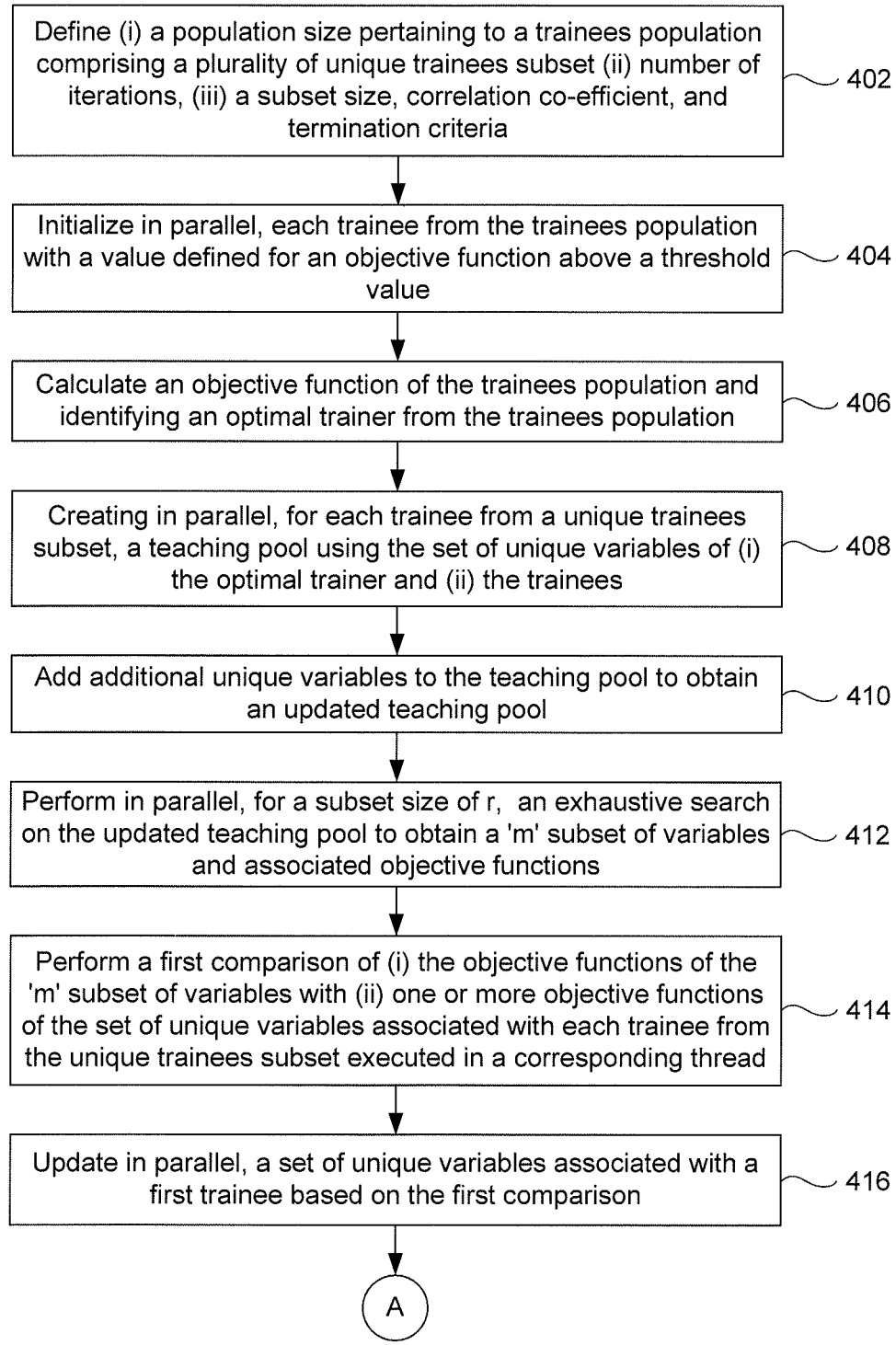
FIG. 4 illustrates an exemplary flow diagram of a processor implemented method for parallelization of a modified teaching learning based search (MTLBSO) technique for variable selection according to an embodiment of the present disclosure.
Figure 5:
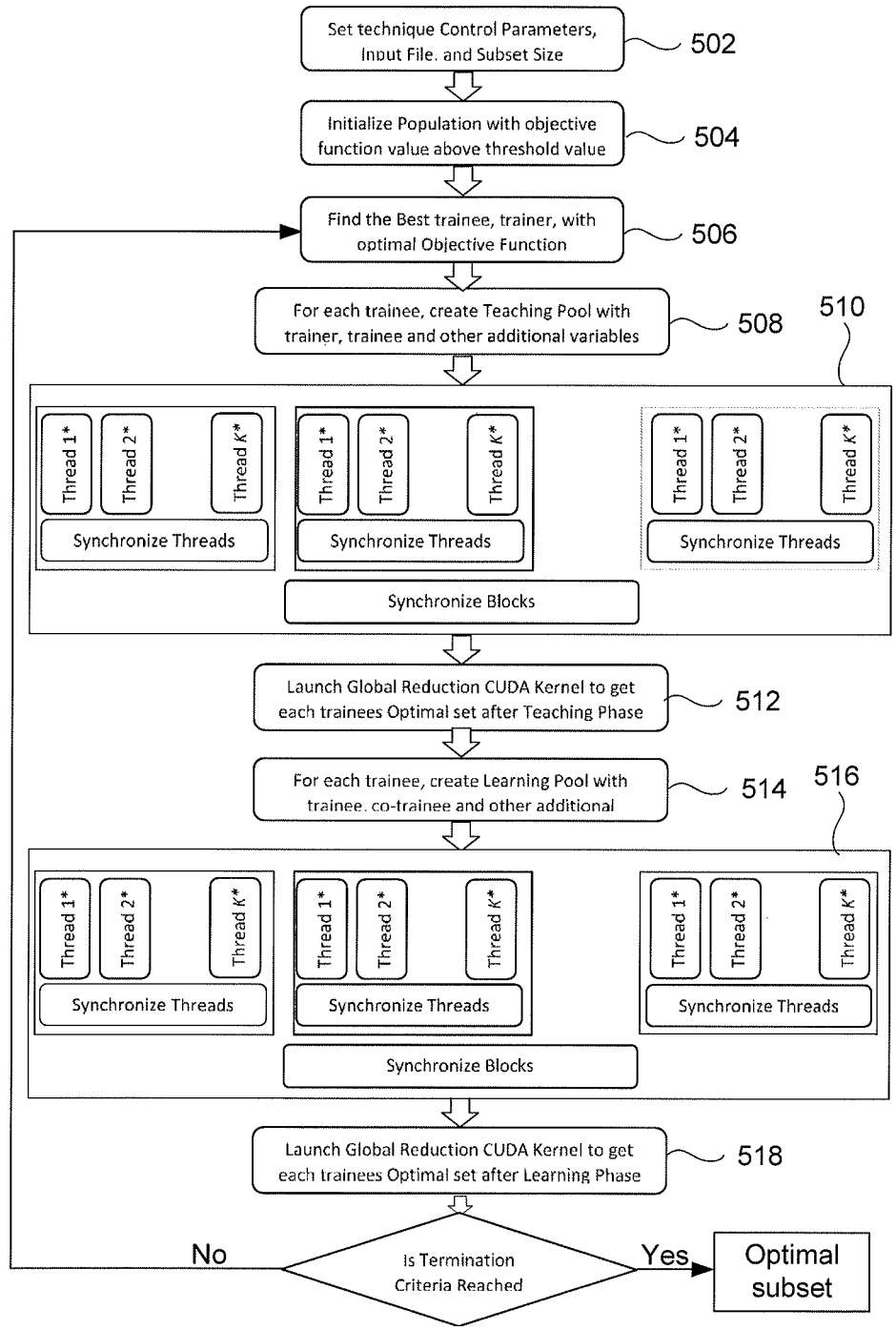
FIG. 5 is a flow diagram illustrating parallelization of a modified teaching learning based optimization technique using a Compute Unified Device Architecture (CUDA) programming model according to an embodiment of the present disclosure.

As depicted in FIG. 2, the MTLBSO technique enables improvisation of the reproducibility of models derived from random method/s by innovative approaches, however with additional computational costs. The performance of the MTLBSO technique as depicted in FIG. 2 can be further improved by parallelizing the technique using innovative approaches, as proposed by the present disclosure. The essential feature to parallelize any method is the presence of independent operations that can run simultaneously. It can be observed from the FIG. 2 that Step 208 to Step 228, in which each trainee completes its learning process, are independent, except in updating the trainer. The updating of the trainer can be omitted and only the trainee can be modified to make these steps completely independent. Though, this modification may slower the speed of convergence of the search problem, the time speed up achieved in parallelizing the method counters this effect. Below, parallelization of this technique using two approaches: Open Multi-Processing (OpenMP as depicted in FIG. 4) and Compute Unified Device Architecture (CUDA as depicted in FIG. 5) is presented.

Figure 3:
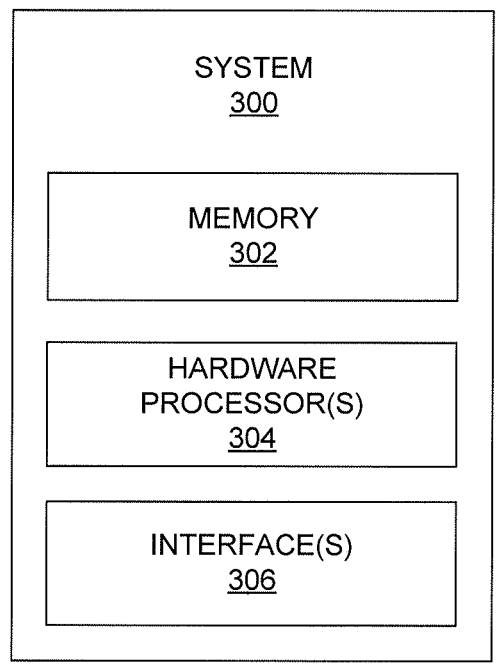
FIG. 3 illustrates an exemplary block diagram of a system for parallelization of a modified teaching learning based search optimization (MTLBSO) technique for variable selection according to an embodiment of the present disclosure.

FIG. 3 illustrates an exemplary block diagram of a system 300 for parallelization of a modified teaching learning based search optimization (MTLBSO) technique for variable selection according to an embodiment of the present disclosure. In an embodiment, the system 300 includes one or more processors 304, communication interface device(s) or input/output (I/O) interface(s) 306, and one or more data storage devices or memory 302 operatively coupled to the one or more processors 304. The one or more processors 304 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 300 can be implemented in a variety of computing systems, such as laptop computers, notebooks, hand-held devices, workstations, mainframe computers, servers, a network cloud and the like.

The I/O interface device(s) 306 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 302 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 300 can be stored in the memory 202.

FIG. 4, with reference to FIG. 3, illustrates an exemplary flow diagram of a processor implemented method for parallelization of a modified teaching learning based search (MTLBSO) technique for variable selection according to an embodiment of the present disclosure. In an embodiment, the system 300 comprises one or more data storage devices or the memory 302 operatively coupled to the one or more hardware processors 304 and is configured to store instructions for execution of steps of the method by the one or more processors 304. The steps of the method of the present disclosure will now be explained with reference to the components of the system 300 as depicted in FIG. 3, and the flow diagram. In an embodiment of the present disclosure, the method as described in FIG. 4 is implemented using an OpenMP technique as mentioned above. OpenMP is a shared memory parallel programming language. The master thread, main process, creates child processes (or threads) which run synchronously and independently. Each child process has its own identifier (ID) and share the program memory among each other. The number of child processes that can be created is limited by the number of CPU cores available. In the MTLBSO technique the steps from 408-418 are executed in parallel using OpenMP threads. A point to note with this approach of parallelizing the MTLBSO is that the serial technique doesn't allow any duplicates in the trainees population. Since each trainee gets updated in steps 216 and 228, in serial technique as depicted in FIG. 2, there is a chance of duplicity, if two OpenMP threads update the trainees with same value dynamically. This can be overcome by maintaining a lock while updating the population, increasing the programming runtime as the steps 216 and 228 execute serially. Despite this the embodiments of the present disclosure have chosen to ignore this duplicity problem, more so because it has not impacted the program's output, and have not implemented any locks in the parallelization of MTLBSO using OpenMP. Furthermore, the process of initializing the trainees with their objective function above a given threshold can also be made parallel. Here the duplicity of population can be minimized by providing the trainee number as seed value for generating its subset.

Referring back to FIG. 4, in an embodiment of the present disclosure, at step 402, the one or more processors 304 define (i) a population size pertaining to a trainees population comprising a plurality of unique trainees subset, wherein each trainees from the trainees population (or the plurality of the unique trainees subset) is associated with a set of unique variables, (ii) number of iterations, (iii) a subset size, correlation co-efficient V, and termination criteria comprising (iv) maximum allowed interrelation coefficient of independent variables $R_{int}$, (v) an objective function to be satisfied by the one or more trainees $r_{min}^2$, and (vi) number of additional unique variables introduced in a teaching phase and a learning phase $Num_{rand}$. In an embodiment of the present disclosure, at step 404, the one or more processors 304 initialize in parallel, each trainee from the trainees population with a value defined for an objective function above threshold. For example, the system 300 initializes the trainees population with $r^2 > r_{min}^2$.

In an embodiment of the present disclosure, at step 406, the one or more processors 304 calculate an objective function of the trainees population and then identifies an optimal trainer from the trainees population (or the plurality of unique trainees subset) based on the calculated objective function. In an embodiment of the present disclosure, the one or more processors 304, perform steps 408 till 416 in a teaching phase. At step 408, the one or more processors 304, create, for each trainee from a unique trainees subset, a teaching pool using the set of unique variables of (i) the optimal trainer and (ii) one or more trainees from the unique trainees subset. In other words, one or more teaching pools are created based on the number of threads being concurrently executed. In an embodiment of the present disclosure, the term variable may be referred to as feature, or attribute variable subset, and may be interchangeably used herein. In an embodiment of the present disclosure, at step 410, the one or more processors 304, adds additional unique (independent) variables to the teaching pool to obtain an updated teaching pool. In other words, one or more updated teaching pools are obtained by adding additional variables to each teaching pool based on the number of threads being concurrently executed. In an embodiment of the present disclosure, at step 412, the one or more processors 304 perform in parallel for each trainee in each execution thread, for a subset size of 'r', an exhaustive search on the updated teaching pool to obtain a 'm' subset of variables and associated objective functions. In other words, the one or more processors 304 perform in parallel for each trainee in each execution thread, for a subset size of 'r', an exhaustive search on all the obtained updated teaching pool(s) (UTPs) to obtain a 'm' subset of variables and associated objective functions. In other words, an exhaustive search is performed on all UTPs being concurrently executed to obtain the 'm' subset of variables and associated objective functions.

In an embodiment of the present disclosure, at step 414, the one or more processors 304 performs a first comparison of (i) one or more objective functions of the 'm' subset of variables with one or more objective functions of the set of unique variables associated with each trainee from the unique trainees subset. In an embodiment of the present disclosure, at step 416, the one or more processors 304 updates the set of unique variables associated with a first trainee based on the first comparison. In one example embodiment, when the objective functions of 'm' subset of variables is minimum or maximum than the objective functions of the set of unique variables associated with the first trainee, the objective functions of the set of unique variables associated with the first trainee is updated. Thus, the first trainee(s) in each execution thread gets updated. In other words, based on the number of threads getting executed in parallel, the corresponding number of trainees (first trainee in each execution thread) are updated in the teaching phase.

In an embodiment of the present disclosure, the one or more processors 304, perform steps 418 till 426 in a learning phase. In an embodiment of the present disclosure, at step 418, the one or more processors 304 select at least one trainee being associated with a set of unique variables, wherein the at least one selected trainee is from the same unique trainee subset corresponding to the thread that is executed in teaching phase and each of a variable from the set of unique variables of the selected trainee is associated with an objective function. In an embodiment of the present disclosure, at step 420, the one or more processors 304 create, for each trainee from the unique trainees subset, a learning pool using the set of unique variables of (i) the at least one selected trainee and (ii) the one or more trainees. In other words, one or more learning pools are created based on the number of threads executed in parallel. In an embodiment of the present disclosure, at step 422, the one or more processors 304 adds (or introduces) additional unique (independent) variables to the learning pool to obtain an updated learning pool. In other words, one or more updated learning pools are obtained by adding additional unique variables to each learning pool based on the number of threads executed in parallel. In an embodiment of the present disclosure, at step 424, the one or more processors 304 concurrently perform for each selected trainee in each execution thread, for a subset size of 'r', an exhaustive search on the updated learning pool (ULP) upon the additional variable being added to obtain a 'n' subset of variables and associated objection functions. In other words, an exhaustive search is performed on all ULPs being executed in parallel to obtain the 'n' subset of variables and associated objective functions. In one example embodiment, the size of the 'm' subset of variables and the 'n' subset of variables may be identical. In another example embodiment, the size of the 'm' subset of variables and the 'n' subset of variables may be different from each other. In an embodiment of the present disclosure, at step 426, the one or more processors 304 perform a second comparison of (i) one or more objective functions of the 'n' subset of variables with (ii) one or more objective functions of the set of unique variables associated with the at least one selected trainee, and (iii) one or more objective functions of the set of unique variables associated with each trainee from the unique trainees subset in that particular thread execution.

In an embodiment of the present disclosure, at step 428, the one or more processors 304 update a set of unique variables associated with a second trainee based on the second comparison. In one example embodiment, when the objective functions of the 'n' subset of variables are minimum or maximum than the objective functions of the set of unique variables associated with the second trainee is updated. In other words, the second trainee(s) in each execution thread gets updated. In other words, based on the number of threads getting concurrently executed, the corresponding number of trainees (second trainee in each execution thread) are updated in the learning phase. In other words, updating the first trainee and the second trainee may happen in parallel across all the thread executions. For example, if there are 4 execution threads, in each execution thread the first trainee and the second trainee are (or may get) updated in parallel. The expressions 'concurrently' and 'in parallel' may be interchangeably used. In an embodiment of the present disclosure, the first trainee and the second trainee are identical (or same candidate). For example, the first trainee and corresponding set of associated unique variables may be updated in both teaching and learning phase. In another embodiment of the present disclosure, the first trainee and the second trainee are different from each other. For example, the first trainee corresponding set of associated unique variables may be updated in the teaching phase, and the second trainee and corresponding set of associated unique variables that are different from the first trainee and corresponding variables may be updated in the learning phase. In an embodiment of the present disclosure, at step 428, the one or more processors 304 iteratively perform the steps 406 till 428 until the termination criteria is satisfied to obtain an optimal subset of variables that is selected for the teaching phase and the learning phase. In an example embodiment, the teaching phase and the learning phase may be executed in series. In another example embodiment, the teaching phase and the learning phase may be concurrently executed. At step 430, the one or more processors 304 generate one or more predictive models based on the selected optimal subset of variables. In an embodiment, one or more predictive models may comprise, but are not limited to, one or more linear regression models, one or more non-linear regression models, and the like.

In an embodiment of the present disclosure, the OpenMP technique is implemented in C programming language. In the Table 2, the embodiments of the present disclosure provide the results of these two steps of parallelizing MTLBSO using OpenMP technique.

TABLE 2

| Parallelized Steps | Subset Size | Number of Threads | Time (sec) | Result (Best subset $r^2$) |
|---|---|---|---|---|
| With Parallelized Population Generation | 7 | 24 | 6 | r2 = 0.860754; 64, 117, 140, 217, 218, 233, 261 |
| Without Parallel Population Generation | 7 | 24 | 6 | r2 = 0.860754; 64, 117, 140, 217, 218, 233, 261 |
| With Parallelized Population Generation | 8 | 24 | 46 | r2 = 0.870034; 93, 117, 140, 217, 218, 233, 254, 261 |
| Without Parallel Population Generation | 8 | 24 | 45 | r2 = 0.870034; 93, 117, 140, 217, 218, 233, 254, 261 |

As it can be observed from the Table 2, parallelizing the population generation step has not produced any significant improvement in the performance. On another hand, Table 3, describes the best speed up achieved by OpenMP over the serial implementation in C programming language itself.

TABLE 3

| Subset Size | Serial Run Time (sec) | OpenMP Threads | OpenMP Run Time (sec) | Speed up |
|---|---|---|---|---|
| 7 | 56 | 24 | 6 | 9.3 |
| 8 | 420 | 24 | 45 | 9.3 |
| 9 | 1820 | 24 | 174 | 10.45 |

FIG. 5, with respect to FIGS. 2 through 4, is a flow diagram illustrating parallelization of a modified teaching learning based optimization technique using a Compute Unified Device Architecture (CUDA) programming model according to an embodiment of the present disclosure. CUDA on NVIDIA Graphical Processing Unit (GPU) is a distributed memory parallel programming language. In the CUDA programming model, the kernel is a function which is called from the host to execute on the GPU device, which consists of a number of GPU threads. All the GPU threads execute the same code defined by the kernel and are divided into a number of blocks (called grid), in which each block contains a specific number of threads (Threads per block). The number of blocks along with the number of threads per block determine total number of threads launched by the kernel based upon following equation:

Total Number of Threads=No. of blocks×Threads per block

Each GPU thread has a unique index within the block, which in turn is also assigned with a unique index. The GPU consists of a number of Streaming Multiprocessors (SMs), each of which comprises a number of cores, along with other units such as schedulers and floating point units. In an embodiment of the present disclosure, NVIDIA Tesla K20 GPU, consisting of 78 SMs was used and each SM contains 32 cores, resulting into a total of 2496 cores. A block of threads can be executed inside one SM and each SM executes a number of blocks (step 510, and step 516), depending on block size and the resources shared by the blocks. Resources available to an SM are shared by the blocks executing on the SM. Threads within a block have access to shared memory that can be accessed only by the threads of that block. The execution of threads in a block may be divided into warps. A warp may refer to a set of threads which execute concurrently in a lock-step. On the Tesla K20, the warp size is 32.

Before porting the MTLBSO the following modifications are done to benefit the most from the CUDA: In the serial technique, the teaching pool and learning pool size depends on the trainee and trainer or co-trainee subset values and therefore, their size is variable. In the CUDA when a variable size is not defined, i.e., static, it allocates the memory of these variables on global memory, increasing the memory access times to these variables. Instead the size of the teaching and learning pool is fixed and this can be changed according to the subset size. In addition, the population size, iterations, and subset size, are also defined static (e.g., as depicted in FIG. 5) to optimize the memory reads and writes of the technique. For every teaching and learning process only the trainee is updated not the trainer or co-trainee as updating the trainer or co-trainee results in synchronization issues and serializes the updation process.

The steps 502 till 508 are executed in a similar manner as that of steps 402 till 408 of FIG. 4. As discussed above, the steps 406 till 428 are concurrently executed on GPU in the following way:

1. For each trainee the teaching pool is created and copied on to a global array.
2. This global array is sent to the CUDA kernel to perform exhaustive search on each of the trainee's teaching pool as depicted in step 510.
3. Then, reduction operation is done on the best subset of each of the CUDA threads, to update each trainee's subset.
4. Similarly, a learning pool is created for each trainee and copied to a global array and the above steps 2 and 3 are executed as depicted in steps 516 till 518.
5. Then, the trainer is updated with the values of updated population, completing one learning cycle or an iteration.

Figure 6:
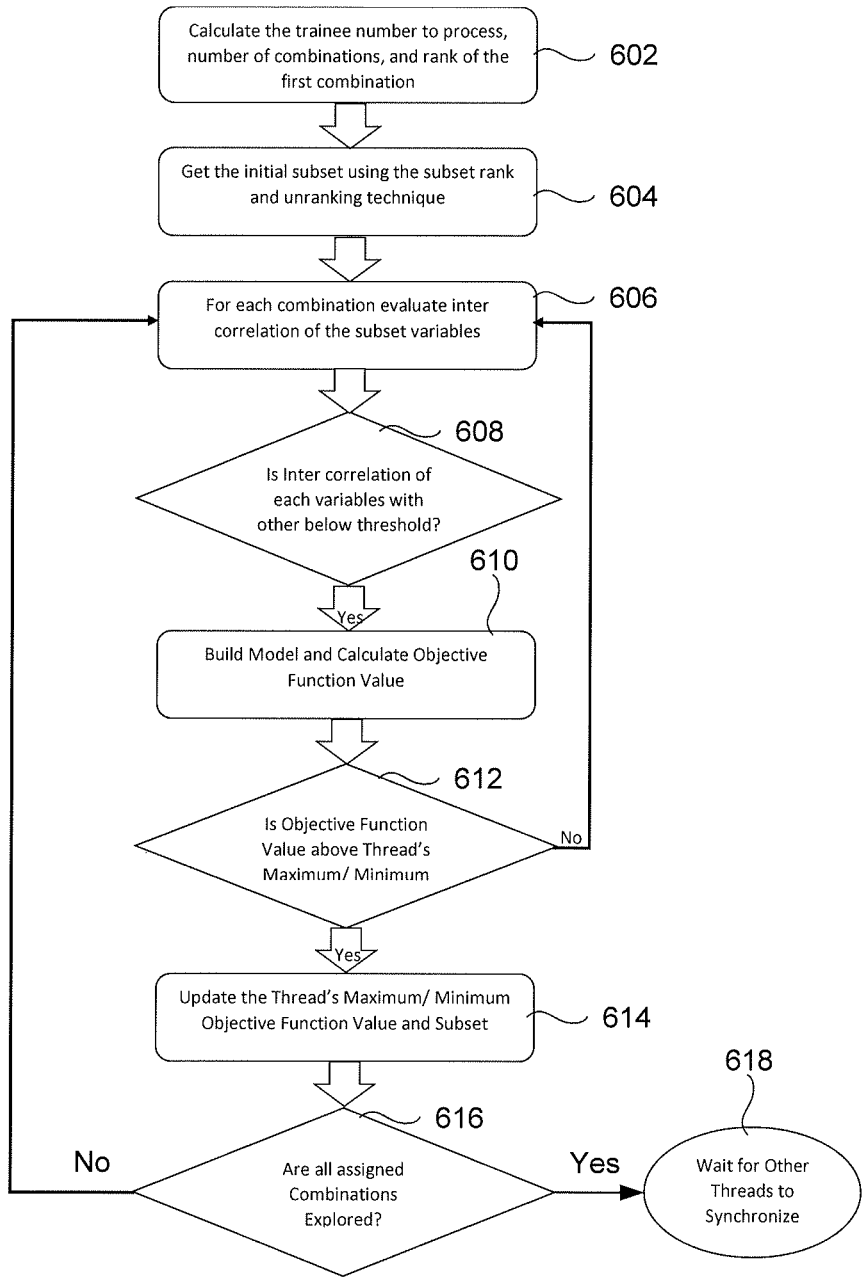
FIG. 6 is an exemplary flow diagram illustrating a CUDA Kernels workflow implemented by the system of FIG. 3 according to an embodiment of the present disclosure.

Each thread of the GPU evaluates a fixed number of combinations of a trainee's teaching or learning pool. This number is based on the number of threads launched, population size, size of teaching or learning pool and subset size. Further optimizations implemented in parallelizing the technique are:
 a. Shared memory declaration of dependent variable.
 b. Conversion of double precision variables to single precision.
 c. Use of non-recursive methods in model building FIG. 6 is an exemplary flow diagram illustrating a CUDA Kernels workflow implemented by the system 300 according to an embodiment of the present disclosure. The steps of the method of the present disclosure will now be explained with reference to the components of the system 300 as depicted in FIG. 3, and the flow diagrams of FIGS. 4 and 5. At step 602, in an embodiment of the present disclosure, the one or more processors 304 calculate the trainee number to process, number of combinations, and rank of a first combination. At step 604, in an embodiment of the present disclosure, the one or more processors 304 obtains an initial subset using subset rank and unranking technique(s). At step 606, in an embodiment of the present disclosure, the one or more processors 304 evaluate for each combination an inter correlation of the subset variables. At step 608, in an embodiment of the present disclosure, the one or more processors 304 determine whether the inter correlation of each variables with other is below threshold. If the inter correlation of each variables with other is not below threshold, the step 606-608 are repeated. Else, if the inter correlation of each variables with other is below threshold, then at step 610, the one or more processor 304 build model and calculates objective function value. In an embodiment of the present disclosure, at step 612, the one or more processors 304 determine whether the objective function value is above thread's maximum or minimum value. If the objective function value is not above thread's maximum or minimum value, the step 606 is repeated. Else, if the objective function value is above thread's maximum or minimum value, the one or more processors 304 update the thread's maximum or minimum objective function value and corresponding subset at step 614. In an embodiment of the present disclosure, at step 616, the one or more processors 304 determine whether all assigned combinations are explored. If all the assigned combinations are explored, then the system waits for other threads to synchronize at step 618. Else, if all the assigned combinations are not explored, the step 606 is repeated.

Below table 4 depicts an illustrative execution time of the CUDA MTLBO:

TABLE 4

| Subset Size | Serial Run Time (sec) | CUDA threads (Grid Size × Block Size) | CUDA Run Time (sec) | Speed up |
|---|---|---|---|---|
| 7 | 56 | 64 × 128 | 4 | 14 |
| 8 | 420 | 512 × 128 | 13 | 32.3 |
| 9 | 1820 | 2048 × 128 | 46 | 39.5 |

Further below depicts table (Table 5) that illustrates different techniques such as CUDA, OpenMP, and Serial for subset size 7, 8, 9, and 12 and the corresponding execution runtimes:

TABLE 5

| Subset Size | 7 | 8 | 9 |
|---|---|---|---|
| CUDA | 4 | 13 | 46 |
| OpenMP | 6 | 45 | 174 |
| Serial | 56 | 420 | 1820 |

Figure 7A:
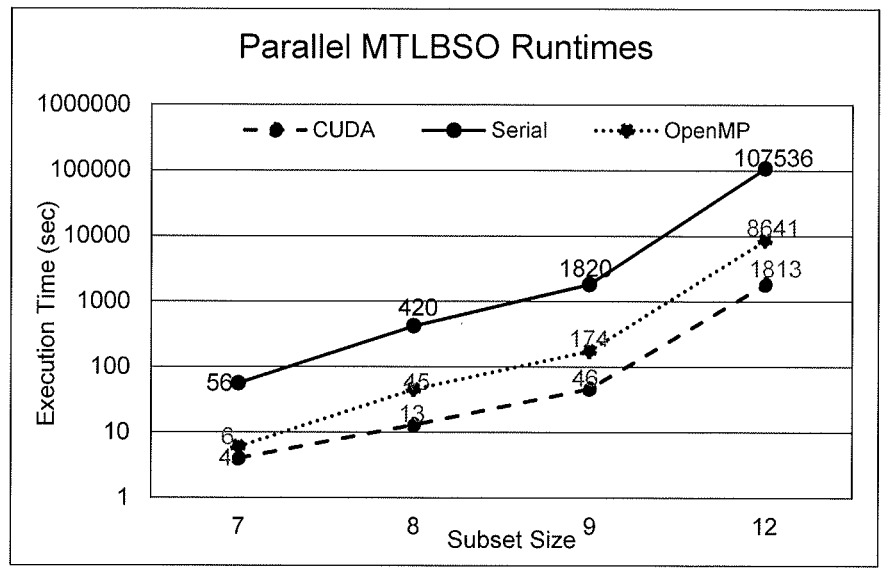
FIG. 7A is a graphical representation that illustrates runtimes of various MTLBSO techniques implemented by the system of FIG. 3 for various subset size according to an embodiment of the present disclosure.

FIG. 7A is a graphical representation that illustrates runtimes of various MTLBSO techniques implemented by the system 300 for various subset size according to an embodiment of the present disclosure.

Further below depicts table (Table 6) that illustrates different techniques for subset size 7, 8, 9, and 12, and the corresponding execution runtimes, where the runtime and speedup for subset size 12 is extrapolated from observed results:

TABLE 6

| Subset Size | Speed Up |
|---|---|
| 7 | 14 |
| 8 | 32 |
| 9 | 39.9 |
| 12* | 59* |

Figure 7B:
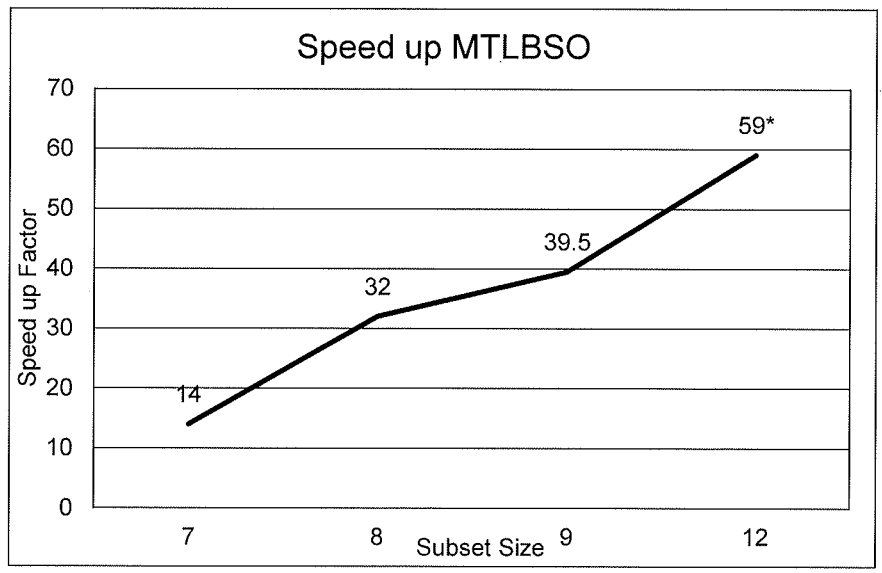
FIG. 7B is a graphical representation that illustrates best performance achieved by various MTLBSO techniques implemented by the system of FIG. 3 for various subset size according to an embodiment of the present disclosure.

FIG. 7B is a graphical representation that illustrates runtimes of Speed up MTLBSO techniques for various subset size according to an embodiment of the present disclosure.

Although, the embodiments of the present disclosure describe OpenMP, and CUDA MTLBSO techniques, the embodiments of the present disclosure may be implemented in any other parallelization techniques, and should not be construed as limitations.

Other Variations:

The teaching and learning process, as disclosed above, in CUDA, parallelization happens one after another. In another case these two processes can be executed simultaneously on GPU. But, it is observed that it effects the performance of the technique as each trainee is not updated until both the teaching and learning phase complete, impacting the results and speed of convergence.

As the time consuming step is exhaustive search of each pool for each trainee, the first approach to parallelize MTLBSO on CUDA may be to parallelize this exhaustive search for each trainee for each phase individually, unlike simultaneous execution of all the trainees teaching phase and later the learning phase. This approach of individual launch of exhaustive search of each trainees pool increase the time of communication between the host and GPU device, hence, deteriorating the time speedup achievable using the GPU.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, BLU-RAYs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   (a) defining, by one or more processors (i) a population size pertaining to a trainees population comprising a plurality of unique trainees subset, wherein each trainee from the plurality of unique trainees subset are associated with a set of unique variables, (ii) number of iterations, (iii) a subset size, correlation co-efficient 'r', and termination criteria comprising (iv) maximum allowed interrelation coefficient of independent variables $R_{int}$, (v) an objective function to be satisfied by each trainee $r_{min}^2$, and (vi) number of additional unique variables introduced in a teaching phase and a learning phase $Num_{rand}$;
   (b) initializing, in parallel, by the one or more processors, each trainee from the trainees population with a value defined for an objective function above a threshold value;
   (c) calculating an objective function of the trainees population and identifying an optimal trainer from the trainees population based on the calculated objective function;
      in the teaching phase, executing in parallel, each unique trainees subset from the plurality of unique trainees subsets in a corresponding execution thread by:
   (d) creating, for each trainee from a unique trainees subset, a teaching pool using the set of unique variables of (i) the optimal trainer and (ii) one or more trainees from the unique trainees subset;

(e) adding additional unique variables to the teaching pool to obtain an updated teaching pool;
(f) performing, for a subset size of r, an exhaustive search on the updated teaching pool to obtain a 'm' subset of variables and associated objective functions;
(g) performing a first comparison of (i) the objective functions of the 'm' subset of variables with (ii) one or more objective functions of the set of unique variables associated with each trainee; and
(h) updating, based on the first comparison, a set of unique variables associated with a first trainee from the unique trainees subset, wherein the first trainee in an execution thread is updated based on a number of threads getting executed in parallel;
  in the learning phase, concurrently executing, each unique trainees subset from the plurality of unique trainees subsets in the corresponding execution thread by:
(i) selecting a trainee being associated with a set of unique variables;
(j) creating, for each trainee from the unique trainees subset, a learning pool using the set of unique variables of (i) the at least one selected trainee and (ii) the one or more trainees from the unique trainees subset;
(k) adding additional variables to the learning pool to obtain an updated learning pool;
(l) performing, for a subset size of r, an exhaustive search on the updated learning pool upon the additional variable being added to obtain a 'n' subset of variables and associated objection functions;
(m) performing a second comparison of (i) the objective functions of the 'n' subset of variables with (ii) one or more objective functions of the set of unique variables associated with the at least one selected trainee, and (iii) one or more objective functions of the set of unique variables associated with each trainee from the unique trainees subset; and
(n) updating, based on a second comparison, a set of unique variables associated with a second trainee from the unique trainees subset; and iteratively performing the steps (c) to (n) until the termination criteria is satisfied to obtain an optimal subset of variables that are selected for the teaching phase and the learning phase,
  wherein the parallelization is achieved with one of an Open Multi-Processing (OpenMP) programming model or a Compute Unified Device Architecture (CUDA) programming model, wherein in the CUDA programming model, when a variable size is static, the CUDA programming model allocates a memory of the static variables to a global memory, increases an access time of the memory to the static variables, and maintains a size of the teaching pool and the learning pool fixed.

2. The processor implemented method of claim 1, further comprising generating one or more predictive models based on the optimal subset of variables.

3. The processor implemented method of claim 1, wherein the teaching pool is created in the teaching phase by combining the set of unique variables of the optimal trainer with that of the one or more trainees from the unique trainees subset, and wherein the learning pool is created in the learning phase by combining the set of unique variables of the at least one selected trainee with that of the one or more trainees from the unique trainees subset.

4. The processor implemented method of claim 1, when the objective functions of 'm' subset of variables is minimum or maximum than the one or more objective functions of the set of unique variables associated with the first trainee, the set of unique variables associated with the first trainee is updated.

5. The processor implemented method of claim 1, when the objective functions of 'n' subset of variables is minimum or maximum than the one or more objective functions of the set of unique variables associated with the second trainee, the set of unique variables associated with the second trainee is updated.

6. The processor implemented method of claim 1, wherein the first trainee and the second trainee are identical.

7. The processor implemented method of claim 1, wherein the teaching phase and the learning phase are executed in series.

8. The processor implemented method of claim 1, wherein the teaching phase and the learning phase are concurrently executed.

9. A system comprising:
  a memory storing instructions;
  one or more communication interfaces; and
  one or more hardware processors coupled to the memory via the one or more communication interfaces, wherein the one or more hardware processors are configured by the instructions to:
    (a) define (i) a population size pertaining to a trainees population comprising a plurality of unique trainees subset, wherein each trainee from the plurality of unique trainees subset are associated with a set of unique variables, (ii) number of iterations, (iii) a subset size, correlation co-efficient 'r', and termination criteria comprising (iv) maximum allowed interrelation coefficient of independent variables $R_{int}$, (v) an objective function to be satisfied by each trainee $r_{min}^2$, and (vi) number of additional unique variables introduced in a teaching phase and a learning phase $Num_{rand}$;
    (b) initialize, in parallel, each trainee from the trainees population with a value defined for an objective function above a threshold value;
    (c) calculate an objective function of the trainees population and identifying an optimal trainer from the trainees population based on the calculated objective function;
      in the teaching phase, concurrently execute, each unique trainees subset from the plurality of unique trainees subsets in a corresponding execution thread by:
    (d) creating, for each trainee from a unique trainees subset, a teaching pool using the set of unique variables of (i) the optimal trainer and (ii) one or more trainees from the unique trainees subset;
    (e) adding additional unique variables to the teaching pool to obtain an updated teaching pool;
    (f) performing, for a subset size of r, an exhaustive search on the updated teaching pool to obtain a 'm' subset of variables and associated objective functions;
    (g) performing a first comparison of (i) the objective functions of the 'm' subset of variables with (ii) one or more objective functions of the set of unique variables associated with each trainee; and
    (h) updating, based on the first comparison, a set of unique variables associated with a first trainee from the unique trainees subset, wherein the first trainee in an execution thread is updated based on a number of threads getting executed in parallel;

in the learning phase, concurrently execute, each unique trainees subset from the plurality of unique trainees subsets in the corresponding execution thread by:
(i) selecting a trainee being associated with a set of unique variables;
(j) creating, for each trainee from the unique trainees subset, a learning pool using the set of unique variables of (i) the at least one selected trainee and (ii) the one or more trainees from the unique trainees subset;
(k) adding additional variables to the learning pool to obtain an updated learning pool;
(l) performing, for a subset size of r, an exhaustive search on the updated learning pool upon the additional variable being added to obtain a 'n' subset of variables and associated objection functions;
(m) performing a second comparison of (i) the objective functions of the 'n' subset of variables with (ii) one or more objective functions of the set of unique variables associated with the at least one selected trainee, and (iii) one or more objective functions of the set of unique variables associated with each trainee from the unique trainees subset; and
(n) updating, based on a second comparison, a set of unique variables associated with a second trainee from the unique trainees subset; and
(o) iteratively perform the steps (c) to (n) until the termination criteria is satisfied to obtain an optimal subset of variables that are selected for the teaching phase and the learning phase,
wherein the parallelization is achieved with one of an Open Multi-Processing (OpenMP) programming model or a Compute Unified Device Architecture (CUDA) programming model, wherein in the CUDA programming model, when a variable size is static, the CUDA programming model allocates a memory of the static variables to a global memory, increases an access time of the memory to the static variables, and maintains a size of the teaching pool and the learning pool fixed.

10. The system of claim 9, wherein the one or more hardware processors are further configured by the instructions to generate one or more predictive models based on the selected optimal subset of variables.

11. The system of claim 9, wherein the teaching pool is created in the teaching phase by combining the set of unique variables of the optimal trainer with that of the one or more trainees from the unique trainees subset, and wherein the learning pool is created in the learning phase by combining the set of unique variables of the at least one selected trainee with that of the one or more trainees from the unique trainees subset.

12. The system of claim 9, wherein when the objective functions of 'm' subset of variables is minimum or maximum than the one or more objective functions of the set of unique variables associated with the first trainee, the set of unique variables associated with the first trainee is updated.

13. The system of claim 9, wherein when the objective functions of 'n' subset of variables is minimum or maximum than the one or more objective functions of the set of unique variables associated with the second trainee, the set of unique variables associated with the second trainee is updated.

14. The system of claim 9, wherein the first trainee and the second trainee are identical.

15. The system of claim 9, wherein the teaching phase and the learning phase are executed in series.

16. The system of claim 9, wherein the teaching phase and the learning phase are concurrently executed.

17. One or more non-transitory machine readable information storage mediums comprising one or more instructions which when executed by one or more hardware processors causes:
(a) defining, by one or more processors (i) a population size pertaining to a trainees population comprising a plurality of unique trainees subset, wherein each trainee from the plurality of unique trainees subset are associated with a set of unique variables, (ii) number of iterations, (iii) a subset size, correlation co-efficient 'r', and termination criteria comprising (iv) maximum allowed interrelation coefficient of independent variables $R_{int}$, (v) an objective function to be satisfied by each trainee $r_{min}^2$, and (vi) number of additional unique variables introduced in a teaching phase and a learning phase $Num_{rand}$;
(b) initializing, in parallel, by the one or more processors, each trainee from the trainees population with a value defined for an objective function above a threshold value;
(c) calculating an objective function of the trainees population and identifying an optimal trainer from the trainees population based on the calculated objective function;
in the teaching phase, executing in parallel, each unique trainees subset from the plurality of unique trainees subsets in a corresponding execution thread by:
(d) creating, for each trainee from a unique trainees subset, a teaching pool using the set of unique variables of (i) the optimal trainer and (ii) one or more trainees from the unique trainees subset;
(e) adding additional unique variables to the teaching pool to obtain an updated teaching pool;
(f) performing, for a subset size of r, an exhaustive search on the updated teaching pool to obtain a 'm' subset of variables and associated objective functions;
(g) performing a first comparison of (i) the objective functions of the 'm' subset of variables with (ii) one or more objective functions of the set of unique variables associated with each trainee; and
(h) updating, based on the first comparison, a set of unique variables associated with a first trainee from the unique trainees subset, wherein the first trainee in an execution thread is updated based on a number of threads getting executed in parallel;
in the learning phase, concurrently executing, each unique trainees subset from the plurality of unique trainees subsets in the corresponding execution thread by:
(i) selecting a trainee being associated with a set of unique variables;
(j) creating, for each trainee from the unique trainees subset, a learning pool using the set of unique variables of (i) the at least one selected trainee and (ii) the one or more trainees from the unique trainees subset;
(k) adding additional variables to the learning pool to obtain an updated learning pool;
(l) performing, for a subset size of r, an exhaustive search on the updated learning pool upon the additional variable being added to obtain a 'n' subset of variables and associated objection functions;
(m) performing a second comparison of (i) the objective functions of the 'n' subset of variables with (ii) one or more objective functions of the set of unique variables associated with the at least one selected trainee, and (iii) one or more objective functions of the set of unique variables associated with each trainee from the unique trainees subset; and (n) updating, based on a second comparison, a set of unique variables associated with a second trainee from the unique trainees subset; and iteratively performing the steps (c) to (n) until the termination criteria is satisfied to obtain an optimal subset of variables that are selected for the teaching phase and the learning phase, wherein the parallelization is achieved with one of an Open Multi-Processing (OpenMP) programming model or a Compute Unified Device Architecture (CUDA) programming model, wherein in the CUDA programming model, when a variable size is static, the CUDA programming model allocates a memory of the static variables to a global memory, increases an access time of the memory to the static variables, and maintains a size of the teaching pool and the learning pool fixed.

18. The one or more non-transitory machine readable information storage mediums of claim 17, wherein the one or more instructions further causes generating one or more predictive models based on the optimal subset of variables.

19. The one or more non-transitory machine readable information storage mediums of claim 17, wherein the teaching pool is created in the teaching phase by combining the set of unique variables of the optimal trainer with that of the one or more trainees from the unique trainees subset, and wherein the learning pool is created in the learning phase by combining the set of unique variables of the at least one selected trainee with that of the one or more trainees from the unique trainees subset.

20. The one or more non-transitory machine readable information storage mediums of claim 17, wherein when the objective functions of 'm' subset of variables is minimum or maximum than the one or more objective functions of the set of unique variables associated with the first trainee, the set of unique variables associated with the first trainee is updated, and wherein when the objective functions of 'n' subset of variables is minimum or maximum than the one or more objective functions of the set of unique variables associated with the second trainee, the set of unique variables associated with the second trainee is updated.

* * * * *